Figure 1:
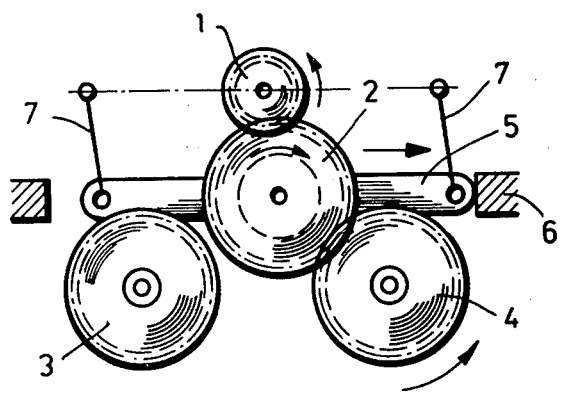

United States Patent [19]

Herleth

[11] 4,137,789

[45] Feb. 6, 1978

[54] DRIVE ASSEMBLY FOR A MAGNETIC-TAPE DEVICE

[75] Inventor: Karl Herleth, Munich, Fed. Rep. of Germany

[73] Assignee: Magnetronic Gesellschaft fur elektronischmechanische Gerate mbH & Co., Entwicklungs-KG, Munich, Fed. Rep. of Germany

[21] Appl. No.: 809,523

[22] Filed: Jun. 24, 1977

[51] Int. Cl.² .................. F16H 57/00; F16H 5/52; F16H 15/00

[52] U.S. Cl. .................. 74/404; 74/202; 74/810

[58] Field of Search .............. 74/404, 810, 414, 202, 74/421 R

[56] References Cited

U.S. PATENT DOCUMENTS 3,528,309  9/1970  Laybourn .................. 74/404

Primary Examiner—Leonard H. Gerin

[57] ABSTRACT

A drive assembly for a cassette tape recorder having a motor driven driving pinion and an intermediate gear permanently engaged with the driving pinion and being adjustable in positions to alternatively engage a feed spool or a take up spool.

8 Claims, 5 Drawing Figures

DRIVE ASSEMBLY FOR A MAGNETIC-TAPE DEVICE

The invention is concerned with a drive assembly for magnetic-tape devices, in particular for cassette-tape recorders, comprising their own feed motor for the selective drive of one of the two feed spools of a tape recorder.

Such drive assemblies are generally known in the art, wherein the winding cores are driven with the aid of toothed gear mechanism (German Patent Application Laid Open for Inspection No. 1,261,331). In the case of this prior-art device, the gear wheels, which are associated with the winding core, are embodied in an axially shiftable manner. The control of the drive wheels is effected via a control rib and a separate switch system.

Other prior-art systems, which operate with slipper cluthes instead of toothed gear wheels, also require a separate switch system, switch-over systems and at least two intermediate wheels.

If a toothed gear mechanism is used, it is not necessary to place essential masses into motion and slow them down by way of numerous indispensable gear wheels. However, a further problem arises since a stationary gear wheel must be coupled with a movable gear wheel, which causes wear of the teeth and susceptibility to mechanical trouble.

These drawbacks, which can be traced back to various and different causes, can be removed simply and surprisingly, in accordance with this invention, by way of a motor, which is rigidly connected to the driving pinion, and one individual toothed intermediate gear wheel, which in turn is continuously engaged with the drive pinion. The toothed gear wheel is mounted movably, limited to its plane upon a circular path around the motor shaft, and which mates with one of the gear wheels of the winding spools, respectively, in the two end positions.

The intermediate gear wheel is preferably slowed down in such a way that it is embodied shiftably with respect to one of the gear wheels of the winding spools, in a translation-type manner, until the state of rest has become engaged after a fast-winding operation of the motor.

It is thus obtained that two stationary gear wheels are coupled, and that the gear wheel (at the feed spool or the take-up spool), which is to be driven after the switch-over process, is placed into a rotating motion only at this time.

Merely a motor with reversible poles is required. Due primarily to the simple pole reversal and no further measure, the drive assembly carries out two functions automatically:

a. Removal of the intermediate gear wheel from the engagement with the former gear wheel (for instance the feed spool);

b. Displacement of the intermediate gear wheel, which is positioned upon the rocking lever, without a rotation of the intermediate gear wheel, while shifting the rocking lever around the motor-pinion axis toward the new gear wheel (for instance of the feed spool) until engagement therewith; and c. Rotary drive of the newly engaged gear wheel.

It is obviously surprising that a drive assembly is herewith suggested, whereby only one single intermediate gear wheel is present for the drive of the take-up spool or the feed spool by the drive pinion.

A separate switch system, separate clutches for the switch system, etc., can be left out.

As it has been stated above, any motor with reversible poles is suitable.

However, if possible, the motor must be without mass. A direct-current motor with collector, and comprising two directions of motion is, for instance, suited. Its power must be selected such that it is not greater than that for the transport of the tape, i.e., the motor power is selected so weak that, even at the end of the tape, a moment larger than the admissible moment (whereby a tearing of the tape is prevented) does not occur. A typical motor has a moment of rotation of 50 centimeter-gramforce.

The intermediate gear wheel is preferably mounted upon a rocking lever, via a slipper clutch.

In accordance with a particularly advantageous embodiment, the slipper clutch consists of a felt pad, fixed to the plate-type portion of the intermediate gear wheel and sliding against the rocking lever.

The rocking lever is mounted shiftably, via rocker arms hinged at its ends.

However, another solution is possible, based on the same principle, characterized by one single intermediate gear wheel which is continuously engaged with the motor pinion, and which is mounted upon a rocking lever which, in turn, is mounted movably at the motor-output shaft, whereby a slipper clutch with a moment of friction greater than that of the rocking-lever-bearing friction is arranged between the pinion and the motor-output shaft.

The friction of the slipper clutch can be adjusted. Advantageously, a spring, concentric with the intermediate-gear axis, is provided for adjusting the bearing moment and the brake moment of the slipper clutch. The spring pressure can be adjusted, for instance by way of compressing the spring and securing with the aid of a Seeger circlip or a similar thing.

In a further development of the measure in accordance with the invention, other clutches linkages, for instance magnetic clutches couplings, are possible.

In this field of the art, the coupling of the intermediate gear wheel and the winding spools without a relative movement has thus become possible for the first time.

The measure in accordance with the invention can be applied for a horizontal or vertical operation. The control can be effected electro-mechanically or electronically.

It must be pointed out that, in the case of a fast-forward or a fast-reverse motion, respectively, the driven plate is decoupled in a common manner, so that no forces are exerted by the letter onto the tape.

The magnet, attracting the head-wheel sledge, which is known in the art, decreases during the shut-down operation.

Obviously, the device is particularly suited for fully remote control. Auto-reversible operation is possible, since merely a change of the direction of rotation of the winding motor is required. Due to the measure in accordance with this invention, a direct or indirect Capstan drive becomes possible, via a separate motor. The head-wheel-sledge actuation is also advantageously effected via electro magnets.

Finally, a separate pause function via an own pause-magnet must be considered.

The cassette-drive assembly can thus be controlled in all its functions by one single electro magnet, for instance the one for the head-wheel sledge. Since the clutches, which are otherwise required for the tape operation, are not present, and since wear-free toothed gear wheels are used, the frequency of maintenance of the device is essentially reduced.

Due to a minimum of mechanical parts, the tool and production expense is maintained within small boundaries. The device can easily be produced with a height of 110 mm, and is thus suited for front loaders.

It is interesting that the coupling device is "self-tensioning" since the contact pressure between the gear wheels is increased as sson as they have been placed into rotation. The contact pressure is increased even more during the fast-forward or fast-reverse motions.

The instantaneous direction of movement is necessarily reversed by way of a reversal of the direction of rotation of the drive pinion.

Adjustable stops limit the possibilities of motion of the rocking lever.

Figure 2:
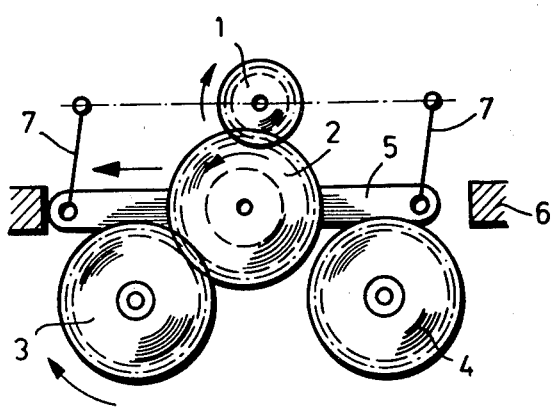
Figure 3:
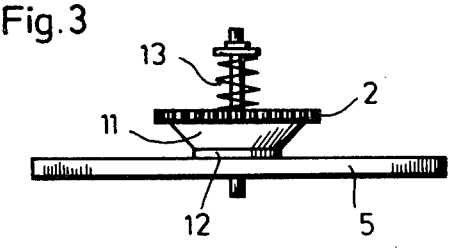

Sample embodiments of the invention are now to be explained in more detail, with reference to the attached drawings, whereby:

FIGS. 1 and 2 show an embodiment of the drive assembly in accordance with the invention, in two operational positions;

FIG. 3 reveals a detail of the clutch; and

Figure 4:
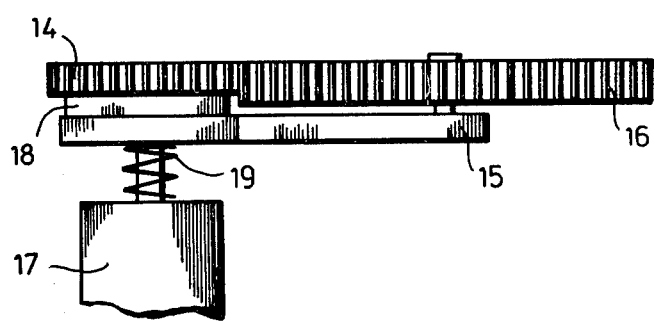
Figure 5:
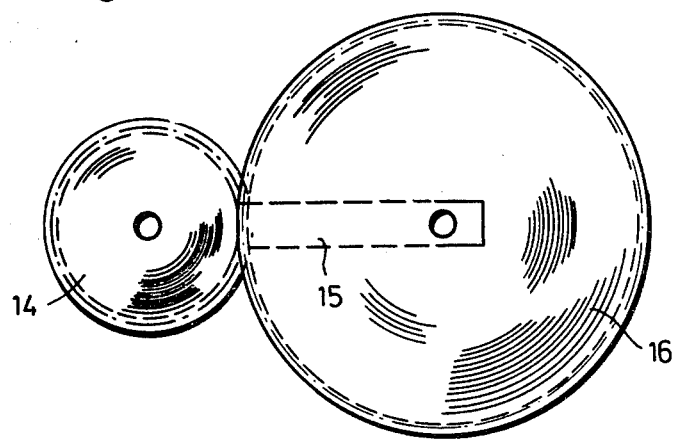

FIGS. 4 and 5 clarify schematically a further embodiment.

The feed spools 3 and take-up spools 4, which are known in the art and which can be driven via gear wheels, are driven by the drive pinion 1. Spools 3 and 4 are spaced apart from each other as required. This is effected via the intermediate gear wheel 2 in accordance with the invention, which is mounted upon a rocking lever 5. Stops 6, which are indicated schematically, but which are adjustable, limit the movement of the rocking lever. The rocking lever 5 is mounted at rocker arms 7. The inter-spacing of the hinged mounting positions of the rocker arms 7 is equal to the spacing from the drive shaft to the mounting position of the intermediate gear wheel 2 upon the lever 5, whereby the rocker arms are parallel to the connection between intermediate gear wheel 2 and motor-shaft axis.

If the pinion 1 is placed into rotation, a force is exerted onto the intermediate gear wheel 2, causing that the intermediate wheel carries out a movement around the drive pinion 1, upon a circular plane. This movement is due to the fact that the intermediate wheel 2 exerts a moment onto the rocking lever which can be rotated freely. The force of this movement obviously increases when the bearing moment or brake moment of the intermediate wheel increases.

If now a defined brake friction or bearing friction is adjusted at the intermediate wheel 2, greater than the bearing friction of the rocking lever 5, in a manner which is to be described later, then the intermediate wheel 2 will move in a rocking manner around the bearing of the rocking lever 5, in dependance on the direction of rotation of the drive pinion.

This rocking movement causes the intermediate wheel 2 to engage one of the two winding spools 3; 4, in dependence on the direction of rotation of the drive pinion 1. The intermediate wheel hereby does not yet carry out any movement of rotation upon its axis, although there is a coupling with the respective winding spool, without a relative movement.

If now a moment is required at the respectively coupled winding spool, this will cause a second force component, depending on the transferred moment, affecting the rocking lever 5 in the same direction as gravity, and adding thereto.

A change on the direction of rotation of the drive pinion 1 thus necessarily requires a reversal of moment, and thus a rocking of the intermediate wheel 2 towards the other winding spool. The force transmission thus is effected via a braking of the intermediate wheel 2, without free-wheeling (couplings) or winding-moment couplings.

In accordance with a sample embodiment (FIG. 3), the braking of the intermediate wheel 2 upon the rocking lever 5 is effected via a slipper clutch with felt pad 12. The felt pad thereby slides continuously upon the rocking lever 5. If desired, a spool, which is rigidly connected with the rocking lever and which has the dimensions of the felt pad, may be provided upon the rocking lever 5. It is favorable when the intermediate wheel is embodied in plate shape, as it is shown in the drawing, and the felt pad is firmly glued to the bottom of the plate. An adjustable spring, 13 concentric with the axis of the intermediate wheel, which has not been denoted, can be biased as desired, for instance by way of placing a groove at the axis and inserting a Seeger ring, thereby making the brake moment adjustable.

In a kinematic reversal of the above-described embodiment, it is suggested in accordance with a variation (FIGS. 4 and 5) to connect the drive motor 17 with the drive pinion 14, via a slipper clutch 18, consisting, for instance, again of a felt pad. The construction here is similar to the one before, with the exception that the clutch is positioned upon the pinion, and not upon the rocking lever. The rocking lever 15 is hereby mounted directly at the motor axis. The spring 19 between motor and rocking lever charges the clutch. The intermediate wheel 16 is positioned upon an axis upon the rocking lever. During the switch-over process, the rocking lever is thus moved again, and it engages the intermediate wheel 16 with one or the other winding spool.

The limits on the rocking-lever movement can also be controlled by a pin upon the rocking lever, whereby the pin, in its end positions, contacts the stop, respectively.

In view of a brief representation, only the features which are considered to be essential for the invention have been discussed in the specification. Everything else was left out.

What is claimed is:

1. A drive assembly for a magnetic recording device of the type including a pair of spaced apart spools, the drive assembly comprising a drive pinion for selectively driving one of the pair of spools, a motor rigidly connected to said pinion, an intermediate toothed gear wheel continuously engaging said pinion and adapted to move about said pinion upon a circular plane, and means for rocking and shifting said gear wheel so that it engages one of the pair of spools, in dependence on the direction of rotation of said pinion.

2. A drive assembly in accordance with claim 1, wherein said rocking and shifting comprise a rocking lever and means for braking said gear wheel so that it moves in a rocking manner and engages one of the pair of spools, said gear wheel being mounted upon said rocking lever.

3. A drive assembly in accordance with claim 2, wherein said braking means comprise a slipper clutch attached to said gear wheel and the latter being mounted on said rocking lever via said slipper clutch.

4. A drive assembly in accordance with claim 3, wherein said slipper clutch comprises a felt pad, and said gear wheel including a plate-shaped portion, said felt pad being firmly attached to said plate-shaped portion and sliding against said rocking lever.

5. A drive assembly in accordance with claim 2, wherein said rocking lever is mounted shiftably via rocker arms which are hinged at its ends.

6. A drive assembly in accordance with claim 4, wherein an adjustable spring, which is concentric with the axis of said gear wheel, is provided for adjusting the bearing or brake moment of said slipper clutch.

7. A drive assembly in accordance with claim 6, wherein said spring adjusts the bearing or brake moment at said gear wheel such that it is greater than the bearing friction of said rocking lever.

8. A drive assembly for a magnetic recording device of the type including a pair of spaced apart spools, the drive assembly comprising a drive pinion for selectively driving one of the pair of spools, an intermediate toothed gear wheel continuously engaging said pinion, a slipper clutch positioned upon said pinion, a motor for driving said pinion via said slipper clutch, and a rocking lever rotatably mounted at the output shaft of said motor for rocking movement about the output shaft, said gear wheel mounted upon said rocking lever, and said slipper clutch being arranged between said pinion and the output shaft of said motor, and having a moment of friction greater than that of the bearing friction of said rocking lever, such that when said pinion is placed into rotation, said gear wheel will move in a rocking manner and engage one of the pair of spools, in dependence on the direction of rotation of said pinion.

* * * * *

UNITED STATES PATENT OFFICE
CERTIFICATE OF CORRECTION

PATENT NO. : 4,137,789
DATED : February 6, 1979
INVENTOR(S) : KARL HERLETH

It is certified that error appears in the above-identified patent and that said Letters Patent are hereby corrected as shown below:

The following entry on the title page of the patent:

Item [45], change "Feb. 6, 1978" to --Feb. 6, 1979--.

Signed and Sealed this

Fifteenth Day of May 1979

[SEAL]

Attest:

RUTH C. MASON
Attesting Officer

DONALD W. BANNER
Commissioner of Patents and Trademarks